UNITED STATES PATENT OFFICE.

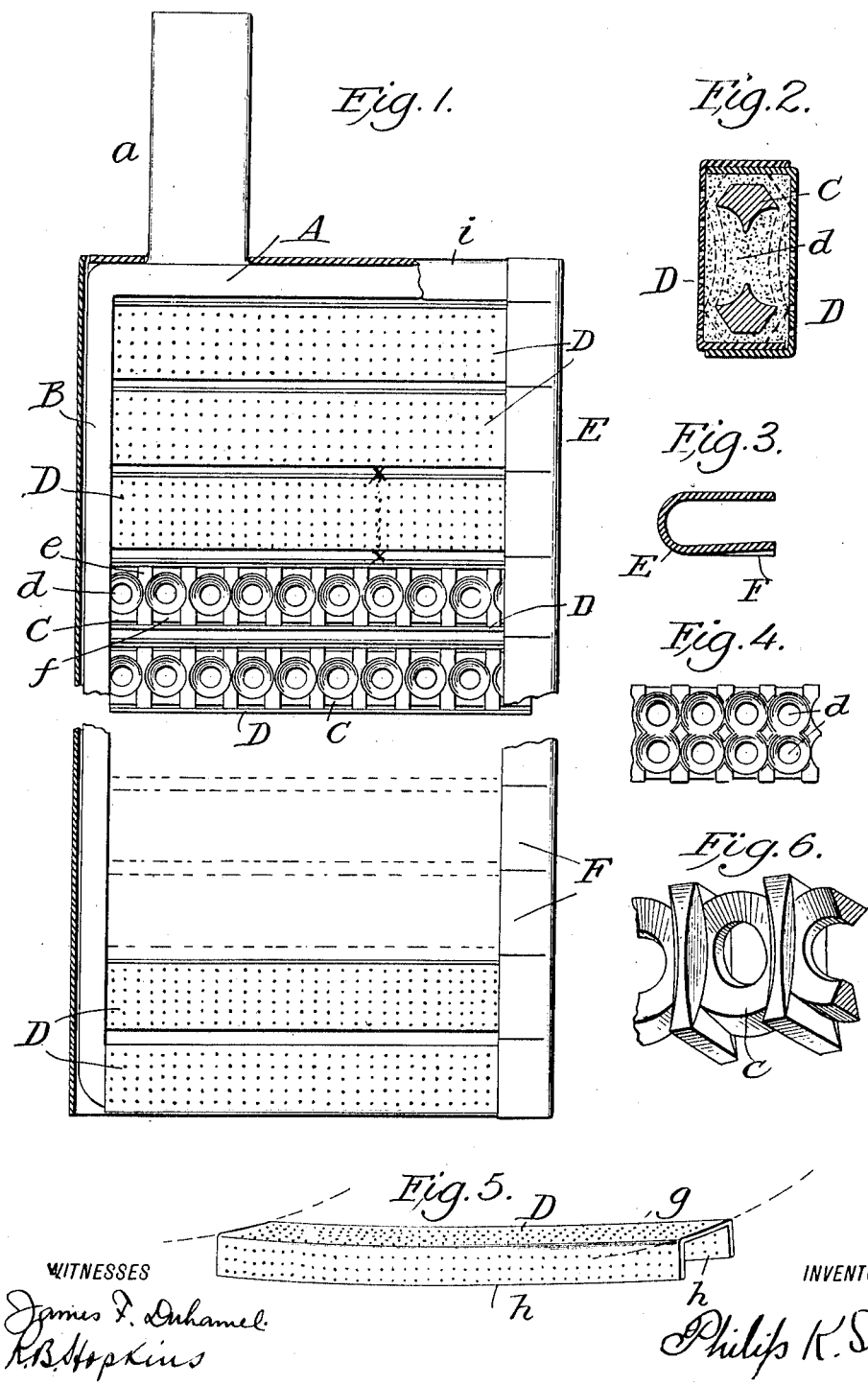

PHILIP K. STERN, OF NEW YORK, N. Y., ASSIGNOR TO MONARCH STORAGE BATTERY COMPANY, OF NEW YORK, N. Y., A CORPORATION OF NEW YORK.

ELECTRICAL ACCUMULATOR.

1,055,366.     Specification of Letters Patent.     Patented Mar. 11, 1913.

Application filed May 12, 1909. Serial No. 495,536.

*To all whom it may concern:*

Be it known that I, PHILIP K. STERN, a citizen of the United States, residing in the city of New York, in the county and State of New York, have invented certain new and useful Improvements in Electrical Accumulators, of which the following is a specification.

My invention in electrical accumulators relates more particularly to that type wherein the active material is pasted upon the surface of a leaden support or into the interstices of a perforated grid of the same material.

It has particular reference to a mechanical means for maintaining contact of the active material against the support or grid in the insuring of electrical conductivity there between.

It has also reference to a means for promoting the circulation of the electrolyte coacting therewith as well as a means for effectively insulating the several elements which compose respectively the anodes and cathodes, with reference to each other, and the objects of my invention are first, to provide for the elements in electrical accumulators, a more simple and more effective means for maintaining an intimate contact between the active material and its support than those in vogue and previous to my invention in so far as I am at present aware, and second to provide means for a more copious circulation of the co-acting electrolyte; third, to insure the insulation of the elements of opposite sign with respect to each other; fourth, to establish the independence of the expansion and contraction of the separate elements with respect to each other, and fifth, to provide a simple and effective envelop or casing for each of the elements, whereby the same are restrained against buckling or warping during chemical activity when the accumulator is in action, and I attain these objects by the construction as illustrated in the drawings hereto attached which forms part of this specification, and the features characteristic of my invention whereby I attain the objects thereof are referred to in the appended descriptive matter relative thereto, and the distinctive features of novelty are finally referred to in the claims at the conclusion of the specification.

With reference to the drawings: Figure 1 is a side elevational contracted view of an element of an electrical accumulator embodying my invention, a portion of the casing being broken away to disclose the formation of the support. Fig. 2 is an enlarged cross sectional end elevational view, taken through one of the units of the element referred to in Fig. 1, substantially on a line *x—x* of said figure. Fig. 3 is an enlarged detailed cross sectional view of one of my improved insulating clamps. Fig. 4 is an enlarged fragmentary modificational view of one of the units contained in the elements substantially as referred to in Fig. 1, showing a double row of perforations. Fig. 5 is a detailed view of the insulating casing for one of the units of an element referred to in Figs. 1 and 2, taken in perspective. Fig. 6 is a perspective view of the cross member.

In the several figures, similar characters of reference are employed to designate like parts wherein, A depicts the element, comprising the frame B and cross members or units C. The said element I prefer to cast or otherwise form of lead containing about 5% of antimony for the positive elements or pure lead for the negative elements. The units C are preferably perforated at intervals intermediately of their width in order to provide a series of countersunk openings *d*, and disposed as pockets for the reception of the active material. The series of pockets are intercepted by transverse partitions *e* which extend laterally beyond the width of the cross bar or unit C, thus establishing between the several partitions a series of compartments *f* which are likewise reserved for the reception of additional active material. The several units C are separated with respect to each other sufficiently to permit of their perforated insulating covers D being assembled on them, presenting as a whole, the appearance of a slotted grid. These are formed in the manner of a channel composed preferably of perforated sheet rubber bent to the form of a rectangle as will be clear by the illustration Fig. 5. As will be observed in this figure, the insulating casing D is composed of sections each of which is slightly curved longitudinally and consists of a surface portion *g* and integral sides *h*, forming braces or trusses. The surface portion g is likewise curved, so as to present a slightly concave surface. The purpose of the curved formation will be referred to hereinafter. The element A is also provided with the usual neck or lug a for establishing electrical communication with a charging and discharging circuit.

In the formation of my improved accumulator, the requisite number of elements A comprising the units C are pasted with the active material by first assembling upon each of the units C the insulating casing D, and on the same side of each of the units, whereupon the said element being supported on a work-bench, table or other suitable foundation, the active material is introduced in a well known manner in sufficient quantity to fill the compartments f and the pockets d and by applying pressure to the surplus paste upon the surface of the element, the same will be forced through and between the compartments f and through the pockets d on the opposite side of the units C and will commence to ooze through the perforations in the sides or trusses h. After the paste has been forced through in this manner to the opposite side of the units C and is withheld by the casing D, a surplus quantity of paste is spread over the surface and a second set of casings D is applied to the units C in a manner so as to envelop the same and confine the active material between the walls or outer surface g and the integral sides or stiffening portions h. The casings D are engaged with each other by overlapping their respective side portions h in a manner as illustrated more clearly in Fig. 2, and in order to completely fill the rectangular tube or envelop thus formed about the units C respectively by the casings D, I subject the upper surface g to sufficient pressure in a suitable press to force the surplus paste out through the perforations in the diametrically opposite casing D. Thus I am enabled to completely fill the pockets d and compartments f as well as the entire remaining space between the opposite surfaces g of the casings D. After thus pasting the elements A I secure the several casings D of each element in their position by longitudinal clamps enveloping the side frames B of each element. These clamps I prefer to construct of a sheet of hard rubber bent into the form of a U longitudinally, as will be more clearly illustrated in Fig. 3 and provided with a series of transverse slots leaving intermediate resilient portions F as spring clips to clamp the casings D at their outer terminals on opposite sides of the unit upon which they are assembled together, and on to the surface of the paste contained in the pockets and compartments d and f respectively.

As previously referred to, the casings D are provided with a reversed curve for their upper surface, the purpose of which is to augment the application of pressure to the surface of the paste intermediately between the side frames B upon a unit C by permitting a greater range within which to force the ends of the casings D down against their resting surfaces, contrary to their resiliency. In order to accomplish the securing of the casings D of an element, I first apply one of the spring clamps E by sliding it edgewise over the surface of a side bar B and the corresponding ends of the assembled casings D, whereupon the opposite ends of the said casings due to the curved formation aforesaid, will assume an outwardly sprung position and upon forcing them against their corresponding surfaces on the respective unit C, I introduce in a similar manner a second spring clamp E on the opposite side bar B, whereupon the entire surface of the element will be enveloped by the hard rubber casing comprising the clamps E and casings D. The upper frame of the element A is provided with a non-perforated casing i to effect a further insulation of the frame B of the element A.

The perforated casings D are constructed preferably of hard vulcanized rubber which is formed from a strip of the said material about .020 inches in thickness and bent in a suitable mold or die when warmed to form the channels as illustrated in Figs. 2 and 5, and when two of these casings are assembled around the unit or cross member C in telescopic relation as illustrated more clearly in Fig. 2 they completely incase the said cross member or unit C and hold the oxid of lead or paste contained in the compartments f and perforations d. The spring clamp E is preferably constructed of a strip of similar material to that of the casings D with the exception that it should be constructed of heavier material preferably about .050 inches and bent in a suitable mold while heated to the form of a U and the series of projecting teeth F may be either formed by slotting the spring clamp E with a saw or shearing the same into a series of cuts prior to bending the same to the form of a U. The projecting teeth F however, are preferably sprung in at their tips as illustrated more clearly in Fig. 3 and when a clamp E is applied to each of the terminals of the casings D the teeth F thereof will be forced to expand, due to the elasticity of the material of which they are composed. This comparative extent of expansion is illustrated in the cross section Fig. 3 at F which illustrates one of the teeth expanded and the section represents a portion of the spring clamp or one of the teeth thereof which has not been expanded. The two spring clamps E applied to the lateral margins of the elements A embrace the frame B and overlap the terminals of the casing D; thus when the active material contained within the casings D expand and contract, the teeth F of the spring clamps E resist the action of expansion and as well apply a continual pressure on to the paste or oxid of lead contained in the compartments f and perforations d of their respective cross members or units C. The side members h of the casings D in the meanwhile truss or stiffen the casing D against buckling in the center, thus, when the two opposite members of a cross bar or unit C are contracting or expanding while the spring tension, due to the clamp E is on its terminals, the oxid or paste contained therein will be subjected to compression which will force it into electrical contact with the metallic support.

It will be observed by the foregoing description that the construction presented provides a pasted grid composed of a series of transverse units disposed as bars, each having an insulated casing which casing is adapted to permit of lateral movement, due to contraction and expansion of the active material by virtue of the end spring clamps engaging the ends of the envelop casing and that each of the said units are respectively independent of each other in this respect. That is to say that in the event of the active material undergoing expansion by electrolysis confined between the opposite walls of its casing which effects the lateral displacement of the casing against the force of the spring clamps E to any of the casings, the neighboring units will not be released from pressure for the reason that each of the clips F of the spring clamp E are independently active in maintaining the pressure of the casings against the action of their respective units. In the assembling of several pairs of units of opposite polarity in the usual manner, the spring clips E on the opposite margins of the elements overlapping the terminals of the casings D provide separators to maintain the elements at their prearranged spacing. The transverse separation between the several units provide circulating channels or ducts through which the electrolyte may freely circulate when the accumulator comprising my improved elements is in action. When it is desired to increase the superficial area of the elements A which would render the units C longer in proportion to their width than that which would be commensurate with stiffness when constructed in accordance with Fig. 1, I prefer to increase the relative width of the bars or units C as referred to in the modification Fig. 4, in which instance I provide a relatively increased pocketing for the active material, whereby the desired relative proportion of the active material to that of the support may be maintained and to this end, a double row of counterbored perforations or pockets d are provided.

The construction thus presented provides a form of electrical accumulator of the pasted type wherein the elements are composed of a plurality of independently active units integrally connected with a frame and means enveloping the units for maintaining contact between the paste and its support on each of the units independent of each other, and the said means providing insulation of the elements with respect to each other.

Having fully described my invention, I claim as new and desire to secure by Letters Patent of the U. S.

1. In an element of the character described, a metallic support spaced to form a plurality of integral units and separated with respect to each other, a non-conducting sectional casing for each of the units and interfitting about the same and arranged on opposite sides of the respective units.

2. In an element of the character described, a conducting support provided with integral perforated units laterally separated with respect to each other, a non-conducting sectional perforated casing for each of the units, provided with overlapping edges embracing the units and arranged in pairs on opposite sides thereof respectively and end spring clamps embracing the edge of the element and engaging the opposite ends of said pairs of units.

3. In an element of the character described, a conducting support provided with integral perforated units and compartments laterally separated with respect to each other, a non-conducting sectional perforated casing for each of the units provided with overlapping edges embracing the units and arranged in pairs on opposite sides thereof respectively and end spring clamps embracing the edge of the element and engaging the opposite ends of said pairs of units, said spring clamps being integrally connected in a series respectively.

4. In an electrical accumulator, a spring clamp separator adapted to embrace the edge of the element on both sides thereof, comprising a plurality of independent clamping members each adapted to clamp upon a portion of the element.

5. In an electrical accumulator, an element provided with integral pasted units laterally spaced with respect to each other, an elementary casing of non-conducting material consisting of a plurality of perforated members surrounding the pasted units and adapted to interfit with each other through the said spacing and disposed as a covering for the element and spring clamps embracing the opposite ends of the members on each side of the element and adapted to force the same into contact with the pasted units of the element.

6. In an electrical accumulator, an element and a casing therefor, consisting of a plurality of non-conducting perforated units arranged in pairs on opposite sides of the element and disposed thereon as a covering for the surface thereof, spring clamps composed of non-conducting material integrally connected in a series for each of the opposite edges of the element and adapted to embrace the ends of the units and clamp the same against the surface of the element.

7. In an electrical accumulator, an element, a non-conducting covering therefor, consisting of units transversely disposed upon the surface of the element and each side thereof composed of perforated strips of non-conducting material, clamps of like material embracing the edges of the element and units at opposite ends thereof and adapted to clamp the units and the element together.

8. In an electrical accumulator, an element divided into a plurality of substantially parallel cross bars, an insulating covering therefor, consisting of semi-tubular units on opposite sides of each of the cross bars and engage, in interfitting relation about the said cross bars, the said units being composed of a non-conducting material and provided with perforations and longitudinal stiffening members at the interfitting edges thereof, clamps of like material embracing the edges of the element and units at opposite ends thereof and adapted to clamp the units and element together.

9. In an electrical accumulator, an element composed of a plurality of integral conducting bars laterally separated from each other, said bars comprising units electrically connected at their terminals, a conducting frame circumscribing the ends of said units, a perforated non-conducting casing surrounding each of the units composed of substantially rectangular tubes on opposite sides of the units and disposed in pairs thereon mutually engaging and overlapping at their edges, a pair of longitudinal clamps embracing the frame of the element and the ends of the casings, said clamp being provided with toothed projections whereby independent freedom of motion is permitted between the adjacent pairs of rectangular tubes, substantially as described.

In testimony whereof, I have signed my name to this specification in the presence of two subscribing witnesses.

PHILIP K. STERN.

Witnesses:
R. B. HOPKINS,
N. D. STURGES.

---

Copies of this patent may be obtained for five cents each, by addressing the "Commissioner of Patents, Washington, D. C."